United States Patent
Truitt

(10) Patent No.: US 12,543,718 B2
(45) Date of Patent: *Feb. 10, 2026

(54) FISHING ROD HOLDER AND BIASED RETAINER

(71) Applicant: Randy Truitt, Melbourne, FL (US)

(72) Inventor: Randy Truitt, Melbourne, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/933,639

(22) Filed: Sep. 20, 2022

(65) Prior Publication Data

US 2023/0015639 A1  Jan. 19, 2023

Related U.S. Application Data

(63) Continuation-in-part of application No. 17/134,675, filed on Dec. 28, 2020, now Pat. No. 11,445,713.

(51) Int. Cl.
*A01K 97/10* (2006.01)
*B63B 17/00* (2006.01)

(52) U.S. Cl.
CPC .............. *A01K 97/10* (2013.01); *B63B 17/00* (2013.01)

(58) Field of Classification Search
CPC ........ A01K 97/10; B63B 17/00; B63B 35/14; B63B 34/05
See application file for complete search history.

(56) References Cited

U.S. PATENT DOCUMENTS

| | | | |
|---|---|---|---|
| 8,794,560 B2 * | 8/2014 | Salentine ................ | A45F 5/004 242/379.2 |
| 2004/0107625 A1 * | 6/2004 | Rienzo ................... | A01K 97/10 43/21.2 |
| 2007/0169395 A1 * | 7/2007 | Rayfield ................ | A01K 97/10 43/17 |
| 2018/0146655 A1 * | 5/2018 | Crossen ................. | A01K 99/00 |
| 2018/0177174 A1 * | 6/2018 | McQuade ............... | F16C 11/06 |
| 2021/0085064 A1 * | 3/2021 | Khalsa ................... | H04M 1/04 |

* cited by examiner

*Primary Examiner* — Magdalena Topolski
*Assistant Examiner* — Shanna Danielle Glover
(74) *Attorney, Agent, or Firm* — Collaborative IP; Paul Ditmyer

(57) ABSTRACT

The fishing rod holder and retainer are configured to hold and retain a fishing rod in a gunwale of a boat. A cylindrical tube is coupled to a top plate and configured to extend downwardly at an angle into the gunwale of the boat to hold the butt of the fishing rod. A rod retainer includes a retainer tether having a retainer fastener at a distal end thereof and positioned for extension at the top plate adjacent the retainer opening to couple to the fishing rod. A biasing device is coupled to the retainer tether at a proximal portion thereof and configured to bias the retainer tether downwardly. The biasing device may include a spring loaded locking spool (e.g. a brake) positioned at a bottom of the cylindrical tube and configured to store a proximal portion of the retainer tether thereon.

11 Claims, 5 Drawing Sheets

FISHING ROD HOLDER AND BIASED RETAINER

CROSS REFERENCE TO RELATED APPLICATIONS

This application is a Continuation-In-Part (CIP) of, and claims priority under 35 U.S.C. § 119 to, application U.S. Ser. No. 17/134,675, filed Dec. 28, 2020. The priority patent applications are herein incorporated by reference in their entirety, including without limitation, the specification, claims, and abstract, as well as any figures, tables, appendices, or drawings thereof.

FIELD OF THE INVENTION

The present invention is related to the field of fishing equipment and, more particularly, to fishing rod holders.

BACKGROUND OF THE INVENTION

Various types of fishing rod holders are known. Such rod holders generally include some type of receiver to hold a part of the fishing rod, typically the butt of the fishing rod.

A known type of fishing rod holder is positioned within the upper edge or gunwale of the side or bulwark of a fishing boat. These fishing rod holders are known as gunwale rod holders and are generally located on the starboard and port sides of a fishing boat in the transom or bow. A gunwale rod holder includes a tube that sits within the bulwark, typically inclined at an angle, and open at the gunwale. Flush-mount rod holders come in various angles from 0 to 30 degrees. The steeper the angle, the more space that is required under the gunwale. The bottom of the rod holder may typically include a small transverse rod that interfaces with a gimble on the fishing rod butt end.

The ability to fish in deep water and to troll requires special equipment that is typically expensive. Fishermen using gunwale rod holders are limited to the extent that the fishing rod may get unexpectedly pulled out of the holder, for example, by a fish hooked on the line. A fishing rod may also be thrust out of the holder due to bouncing from waves. Such fishing rods may be secured in the conventional fashion by a fabric strap having a clip at one end connected to the reel, and a loop at the opposite end tied to a boat cleat.

U.S. Pat. No. 10,412,949 is directed to a fishing rod stanchion that is configured to be mounted on a gunwale or stern of a vessel and to receive and secure a fishing rod while trolling or reeling in a fish. A security cable may connect a fishing rod to the fishing rod stanchion.

However, such straps and cables do not reliably secure a rod in a gunwale rod holder, and also do not provide enough flexibility to secure rods of different types, (bent butt trolling rods) sizes, and lengths while being adjustable, settable and retractable.

Therefore, it would be desirable then to provide a device which would address the many shortcomings of the present conventional approaches.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the foregoing in mind, one of the many objects of the present invention is to provide a gunwale rod holder with an included rod retaining feature that is adjustable, settable and retractable to prevent a fishing rod from getting pulled or bounced out of the gunwale of the boat.

An embodiment of the present invention provides a fishing rod holder and retainer configured to hold and retain a fishing rod in a gunwale of a boat, the fishing rod holder and retainer comprising: a top plate configured to be mounted on a top surface of the gunwale of the boat, and including a plurality of mounting holes, a main opening configured to receive a butt of the fishing rod, and a retainer opening; a cylindrical tube, coupled to the top plate, aligned with the main opening, and configured to extend downwardly at an angle into the gunwale of the boat to hold the butt of the fishing rod; a rod retainer comprising a retainer tether having a retainer fastener at a distal end thereof and positioned for extension at the top plate adjacent the retainer opening to couple to the fishing rod; and a biasing device coupled to the retainer tether at a proximal portion thereof and configured to bias the retainer tether downwardly within the retainer opening.

Additionally and/or alternatively, the retainer fastener is configured to couple to a fixture on a reel of the fishing rod or the retainer fastener is configured to couple to a fixture on the fishing rod.

Additionally and/or alternatively, the top plate further includes a retainer fastener recess (also referred to as a retainer fastener storage, for example, a retainer clasp recess), adjacent the main opening, to house the retainer fastener when not in use.

Additionally and/or alternatively, retainer fastener recess is integrated with the retainer opening of the top plate.

Additionally and/or alternatively, the biasing device includes a spring loaded locking spool positioned at a bottom of the cylindrical tube and configured to store a proximal portion of the retainer tether thereon.

Additionally and/or alternatively, the spring loaded locking spool defines a brake configured to stop the retainer tether at a selected length during extension of the retainer fastener and retainer tether.

Additionally and/or alternatively, the biasing device includes a selectively releasable spool adjacent a bottom end of the cylindrical tube and configured to store a proximal portion of the retainer tether thereon.

Additionally and/or alternatively, the top plate, and cylindrical tube are stainless steel.

Additionally and/or alternatively, the retainer tether includes a protective coating.

Another embodiment is directed to a fishing rod holder and retainer configured to hold and retain a fishing rod in a gunwale of a boat, the fishing rod holder and retainer comprising: a top plate configured to be mounted on a top surface of the gunwale of the boat, and including a main opening configured to receive a butt of the fishing rod, a retainer opening, and a retainer fastener storage (also referred to as retainer fastener recess, for example, a retainer clasp recess), adjacent the main opening; a cylindrical tube, coupled to the top plate, aligned with the main opening, and configured to extend downwardly at an angle into the gunwale of the boat to hold the butt of the fishing rod; and a rod retainer comprising a retainer tether having a retainer fastener at a distal end thereof and positioned for extension at the top plate adjacent the retainer opening to couple to the fishing rod, and wherein the retainer fastener storage houses the retainer fastener when not in use; wherein the retainer tether extends down into the retainer channel; and a biasing device coupled to the retainer tether at a proximal portion thereof and configured to bias the retainer tether downwardly within the retainer channel.

Additionally and/or alternatively, the retainer fastener is configured to couple to a fixture on a reel of the fishing rod.

Additionally and/or alternatively, the retainer fastener is configured to couple to a fixture on the fishing rod.

Additionally and/or alternatively, the biasing device includes a spring loaded locking spool positioned at a bottom of the cylindrical tube and configured to store a proximal portion of the retainer tether thereon.

Additionally and/or alternatively, the spring loaded locking spool defines a brake configured to stop the retainer tether at a selected length during extension of the retainer fastener and retainer tether.

Additionally and/or alternatively, the biasing device further includes a selectively releasable spool adjacent a bottom end of the cylindrical tube and configured to store a proximal portion of the retainer cable thereon.

Additionally and/or alternatively, the top plate and cylindrical tube are stainless steel.

Additionally and/or alternatively, the retainer cable includes a protective coating.

Another embodiment is directed to a fishing rod holder and retainer comprising: a top plate including a main opening and a retainer opening; a cylindrical tube coupled to the top plate, aligned with the main opening, and configured to extend downwardly away from the top plate at an angle; a rod retainer comprising a retainer tether having a retainer fastener at a distal end thereof and positioned for extension at the top plate adjacent the retainer opening; a biasing device coupled to the retainer tether at a proximal portion thereof and configured to bias the retainer tether downwardly within the retainer channel; wherein the top plate further includes a retainer fastener storage (also referred to as retainer fastener recess, for example, a retainer clasp recess), adjacent the main opening, to house the retainer fastener when not in use; wherein retainer fastener storage is integrated with the retainer opening of the top plate; and wherein the biasing device includes a spring loaded locking spool positioned at a bottom of the cylindrical tube and configured to store a proximal portion of the retainer tether thereon.

Additionally and/or alternatively, the spring loaded locking spool defines a brake configured to stop the retainer tether at a selected length during extension of the retainer fastener and retainer tether.

Additionally and/or alternatively, the top plate and cylindrical tube are stainless steel.

Additionally and/or alternatively, the retainer tether includes a protective coating.

DETAILED DESCRIPTION OF THE INVENTION

Figure 1:
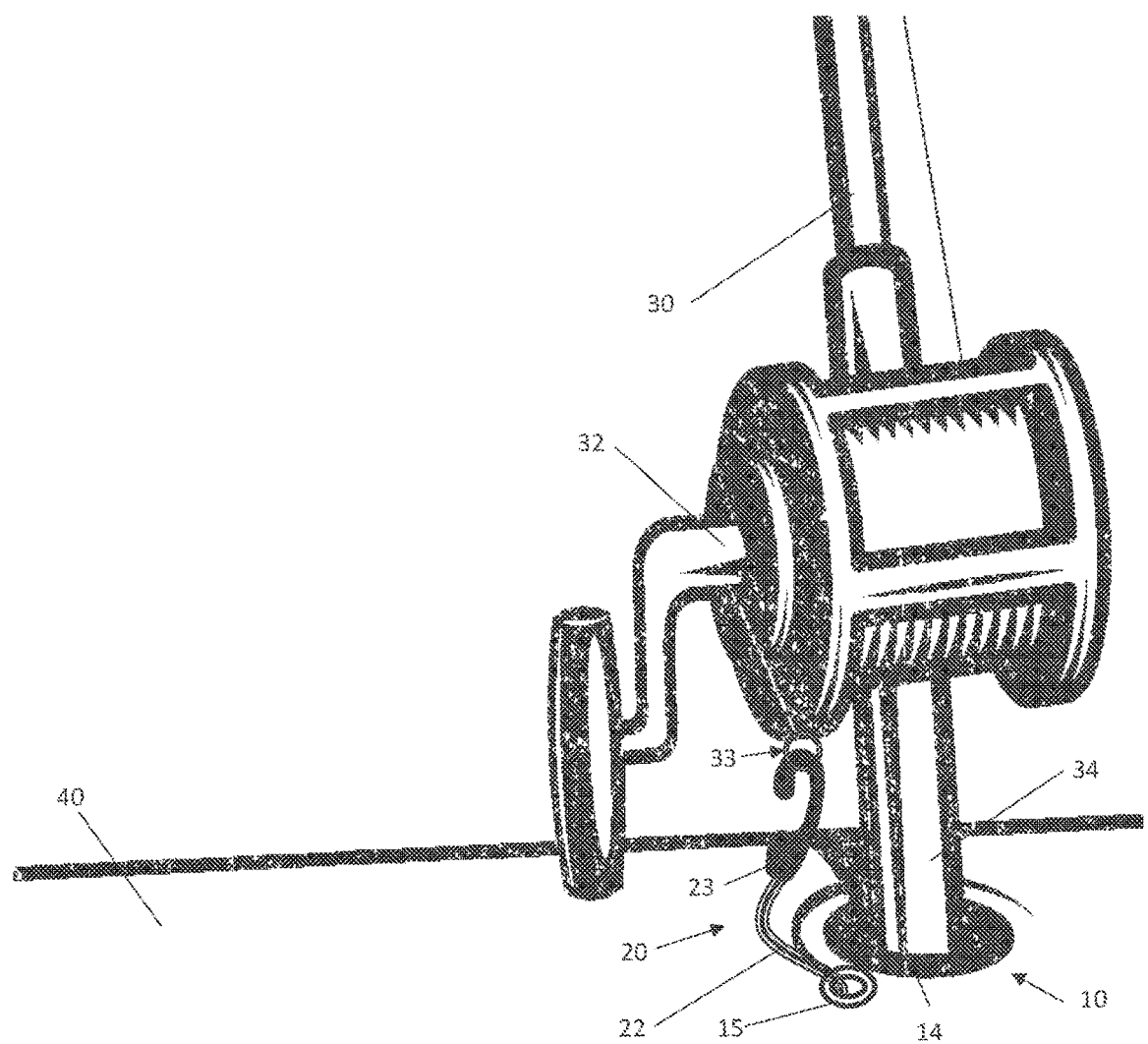
FIG. 1 is a perspective view illustrating a fishing rod and reel positioned in a gunwale rod holder and retainer according to an embodiment of the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

Before describing the present disclosure in detail, it is to be understood that this disclosure is not limited to parameters of the particularly exemplified systems, methods, apparatus, products, processes, and/or kits, which may, of course, vary. It is also to be understood that the terminology used herein is only for the purpose of describing particular embodiments of the present disclosure and is not necessarily intended to limit the scope of the disclosure in any particular manner. Thus, while the present disclosure will be described in detail with reference to specific embodiments, features, aspects, configurations, etc., the descriptions are illustrative and are not to be construed as limiting the scope of the claimed invention. Various modifications can be made to the illustrated embodiments, features, aspects, configurations, etc. without departing from the spirit and scope of the invention as defined by the claims. Thus, while various aspects and embodiments have been disclosed herein, other aspects and embodiments are contemplated.

Unless defined otherwise, all technical and scientific terms used herein have the same meaning as commonly understood by one of ordinary skill in the art to which the present disclosure pertains. While several methods and materials similar or equivalent to those described herein can be used in the practice of the present disclosure, only certain exemplary materials and methods are described herein.

Various aspects of the present disclosure, including devices, systems, methods, etc., may be illustrated with reference to one or more exemplary embodiments or implementations. As used herein, the terms "embodiment," "alternative embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

It will be noted that, as used in this specification and the appended claims, the singular forms "a," "an" and "the" include plural referents unless the content clearly dictates otherwise. Thus, for example, reference to a "sensor" includes one, two, or more sensors.

As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct connection between two components or, where appropriate, an indirect connection to one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "left," "right," "up," "down," "upper," "lower," "inner," "outer," "internal," "external," "interior," "exterior," "proximal," "distal" and the like can be used solely to indicate relative directions and/or orientations and may not otherwise be intended to limit the scope of the disclosure, including the specification, invention, and/or claims.

Where possible, like numbering of elements have been used in various figures. In addition, similar elements and/or elements having similar functions may be designated by similar numbering. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where a range of values (e.g., less than, greater than, at least, and/or up to a certain value, and/or between two recited values) is disclosed or recited, any specific value or range of values falling within the disclosed range of values is likewise disclosed and contemplated herein.

It is also noted that systems, methods, apparatus, devices, products, processes, compositions, and/or kits, etc., according to certain embodiments of the present invention may include, incorporate, or otherwise comprise properties, features, aspects, steps, components, members, and/or elements described in other embodiments disclosed and/or described herein. Thus, reference to a specific feature, aspect, steps, component, member, element, etc. in relation to one embodiment should not be construed as being limited to applications only within the embodiment. In addition, reference to a specific benefit, advantage, problem, solution, method of use, etc. in relation to one embodiment should not be construed as being limited to applications only within the embodiment.

The headings used herein are for organizational purposes only and are not meant to be used to limit the scope of the description or the claims. To facilitate understanding, like reference numerals have been used, where possible, to designate like elements common to the figures.

Embodiments of the invention, as shown and described by the various figures and accompanying text, provide a gunwale rod holder with an adjustable, settable and retractable rod retaining feature to prevent a fishing rod from getting pulled or bounced out of the gunwale of a boat.

Figure 2:
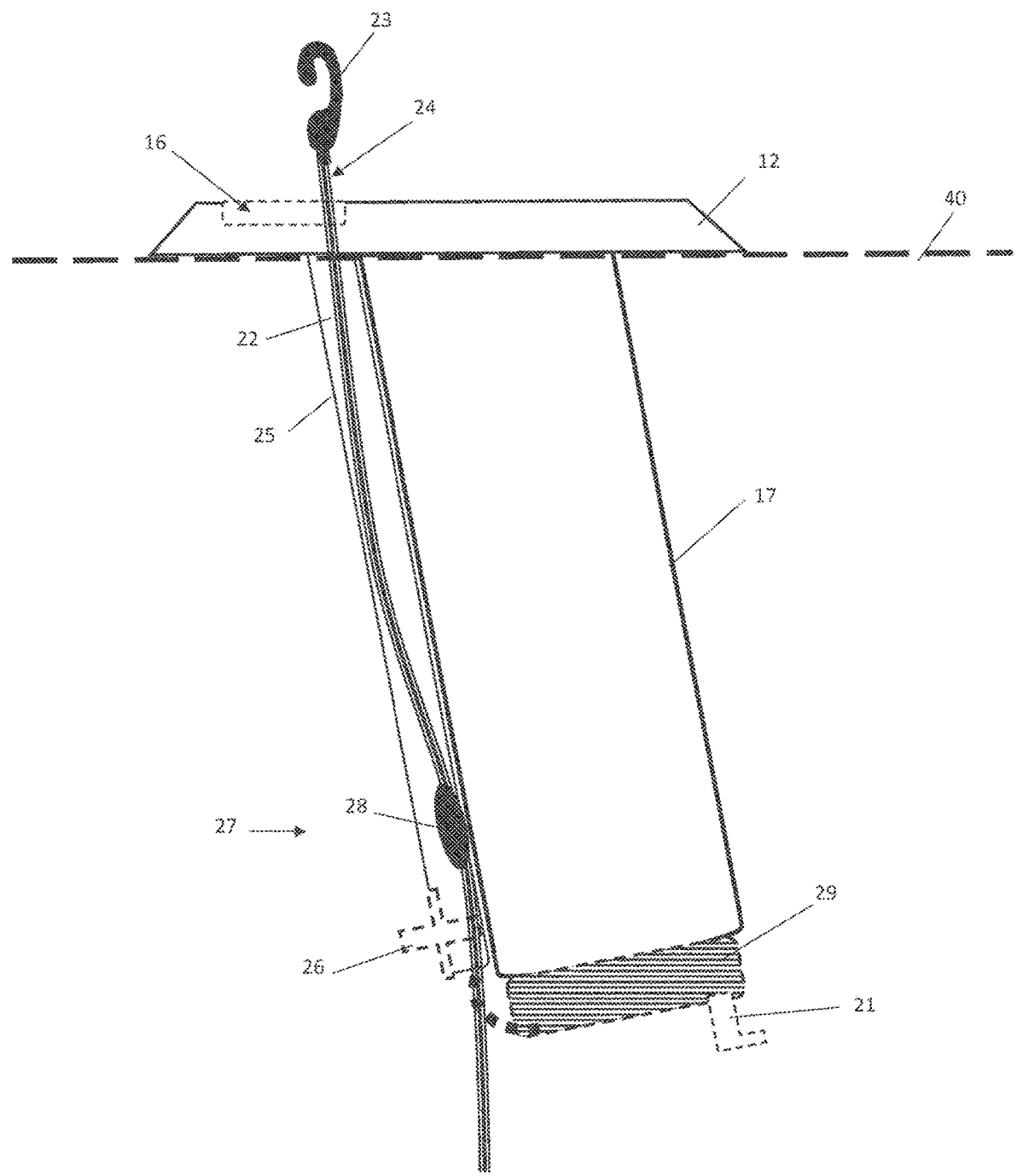
FIG. 2 is a side view illustrating the gunwale rod holder and retainer of FIG. 1 and below the gunwale of the boat.
Figure 3:
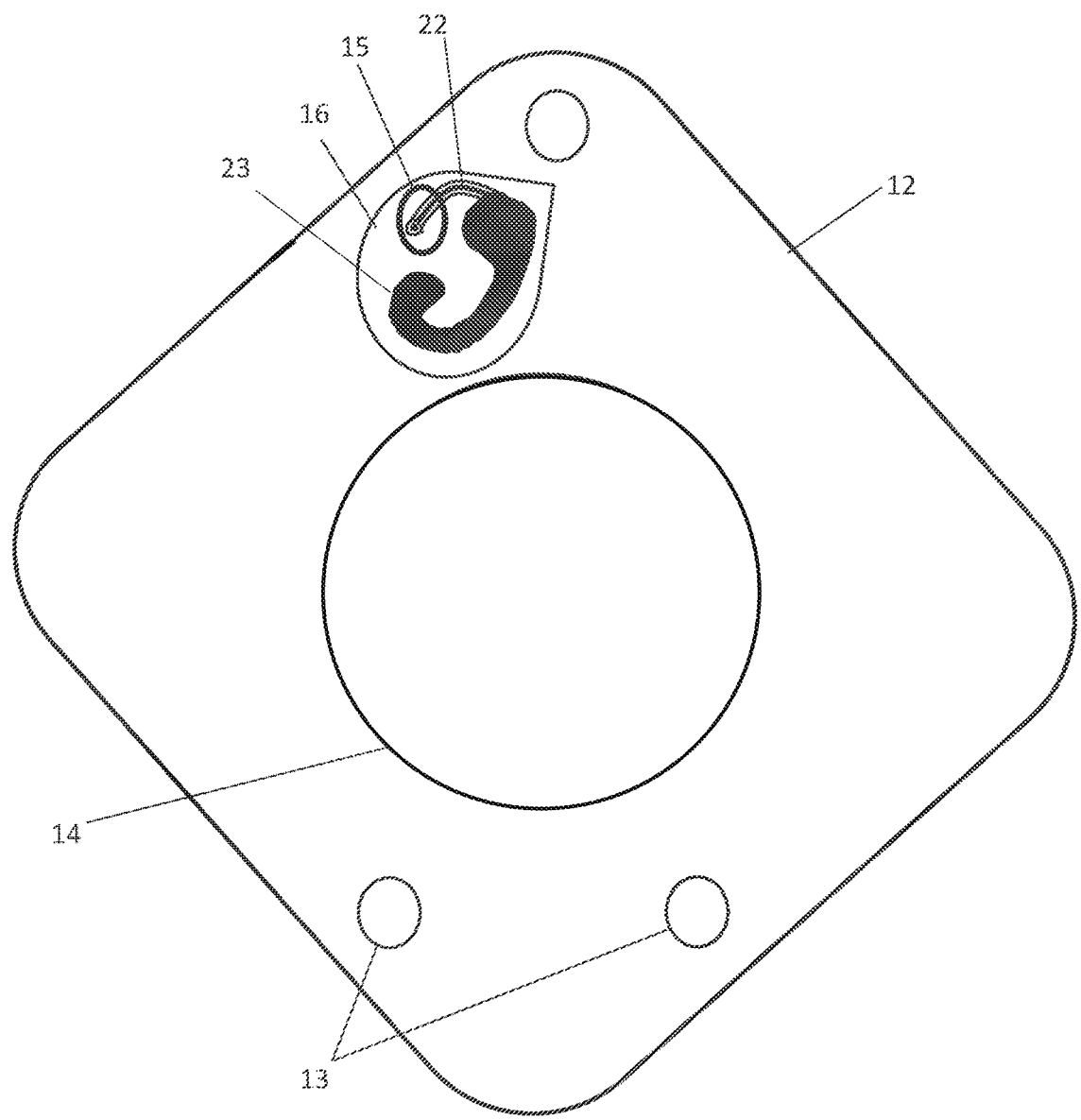
FIG. 3 is a top view illustrating the gunwale rod holder and retainer of FIG. 1 and positioned in the gunwale of the boat.

FIGS. 1-3 illustrate features of a gunwale rod holder 10 and retainer 20 according to an embodiment of the invention. FIG. 1 is a perspective view illustrating a fishing rod 30 and reel 32 positioned in the gunwale rod holder 10 and retainer 20 according to an embodiment of the invention. The butt 34 of the deep-sea fishing rod 30 is adapted to be manually held by a fisherman while the fisherman is standing near the rail, transom or bow of a fishing boat. However, as discussed above, the butt 34 of the fishing rod 30 is also adapted to be held in a rod holder such as the gunwale rod holder 10.

FIG. 2 is a side view illustrating the gunwale rod holder 10 and retainer 20 including below the gunwale 40, or rail, of a boat. The gunwale 40 is the top edge of the hull of the boat, and bulwark is a defensive wall or rampart. FIG. 3 is a top view illustrating the gunwale rod holder 10 and retainer 20 and positioned in the gunwale 40 of the boat.

So, the fishing rod holder 10 and retainer 20 are configured to hold and retain the fishing rod 30 in the gunwale 40 of the boat. The fishing rod holder 10 includes a top plate 12 configured to be mounted on a top surface of the gunwale 40 of the boat. The shape of the top plate 12 may vary, for example, the top plate 12 may be about 4 to 4.5 inches long by 3 to 3.5 inches wide. The top plate 12 may include a plurality of mounting holes 13, and a main opening 14 configured to receive the butt 34 of the fishing rod 30. The top plate 12 also includes a retainer opening 15, and a retainer clasp/fastener recess 16 (also referred to as retainer fastener storage, for example, a retainer clasp recess), adjacent the main opening 14, and surrounding the retainer opening 15 to house a retainer clasp 23 when not in use. A cylindrical tube 17 is coupled to the top plate 12 and aligned with the main opening 14 and configured to extend downwardly at an angle into the gunwale 40 of the boat to hold the butt 34 of the fishing rod 30. The top plate 12 and cylindrical tube 17 are preferably made of stainless steel or any other corrosion resistant material such powder coated aluminum or marine plastics, such as high-density polyethylene (HDPE).

Metal components on offshore boats are usually made of either aluminum or stainless-steel. Aluminum is cheaper, but because it is less sturdy than stainless-steel it must be made thicker. Stainless is the stronger choice and is more resistant to corrosion. Either way, the metal must be protected from the harsh elements that it is exposed to in the boating environment. Stainless steel is usually polished to a bright and shiny finish to protect it. This is easy to maintain and easy to clean. With a quick rinse, it can last years. If you do get any corrosion or surface rust on stainless-steel, it is usually quickly and easily tended to with a stainless-steel cleaner.

The rod retainer 20 is adjustable, settable and retractable, includes a retainer tether or cable 22 having the retainer fastener or clasp 23 at a distal end 24 thereof and positioned for extension at the top plate 12 adjacent the retainer opening 15 to couple to the fishing rod 30. The retainer clasp 23 is configured to couple to a fixture 33 on a reel 32 of the fishing rod 30 or to a fixture (not shown) on the rod 30. The retainer cable 22 can be any of a cord, lace, lacing, line, rope, string, wire or any other elongated, flexible or stiff, retaining feature capable of being adjustable, settable and retractable. The retainer clasp 23 can be any of various devices that clasp, grip, fasten, hook or otherwise releasably secure, couple, connect or attach the retainer cable 22 to the rod 30 and/or reel 32. Both the retainer cable 22 and the retainer clasp 23 may be coated with a protective coating such as vinyl, plastic, paint, etc.

A retainer channel 25 is coupled to the top plate 12 and aligned with the retainer opening 15 and configured to extend downwardly into the gunwale 40 of the boat to guide the retainer cable 22. The retainer cable 22 extends down into the retainer channel 25 and is configured to stop at a selected length during extension of the retainer clasp 23 and retainer cable 22. A cable length setting device 26 is positioned on the retainer channel 25 and configured to selectively set an adjusted length of the rod retainer 20 upon extension of the retainer clasp 23 and retainer cable 22 when coupled to the fishing rod 30. The cable length setting device 26 may be a set screw, for example, or any other feature capable of setting the length of the retainer cable 22 so that the fishing rod 30 and reel 32 are securely retained in the gunwale rod holder 10 during the various types of fishing and/or boating.

A biasing device 27 is coupled to the retainer cable 22 at a proximal portion thereof and configured to bias the retainer cable 22 downwardly within the retainer channel 25. For example, the biasing device 27 may include a weight 28 coupled to the retainer cable within the retainer channel. The weight 28 may be metal, for example, and tied, crimped, integrated or otherwise positioned on the retainer cable 22. The weight 28 will also act as a cable stop to stop extension of the retainer cable 22 by stopping at the top of the retainer channel 25. The biasing device 27 may be a selectively releasable spool 29 adjacent a bottom end of the cylindrical tube and configured to store a proximal portion of the retainer cable 22 thereon. For example, such a releasable spool 29 may include a spring or other mechanism to bias and retract the retainer cable 22 via the retainer channel 25 and store a portion of the retainer cable thereon. The releasable spool 29 may include a locking mechanism, such as a push button, which may also act to set an extended length of the retainer cable 22, e.g. similar to the cable length setting device 26, and/or act as a cable stop. The releasable spool 29 may include a handle 21 or crank to aid in winding the retainer cable 22 onto the releasable spool 29.

Accordingly, while offshore fishing (trolling, kite fishing etc.), a fisherman will place the butt of their fishing rod 30 (and attached reel 32) into the gunwale rod holder 10 of the present invention. Then, the fisherman will grab the retainer clasp 23 and pull a length of retainer cable 22 out of the retainer channel 25 against the bias of the biasing device 27. The retainer clasp 23 is then coupled to the fishing rod 30, e.g. to the fixture 33 on the reel 32 of the fishing rod 30 or to a fixture on the rod 30 itself. The biasing device 27, e.g. the weight 28, will retract the retainer cable 22 down into the retainer channel 25 up until there is tension created by the retainer clasp 23 being coupled to the fishing rod 30. The fisherman may then activate the cable length setting device 26 to set the adjusted length of the rod retainer 20 while fishing and/or boating so that the fishing rod 30 and reel 32 are securely retained in the gunwale rod holder 10.

If the fisherman needs to retrieve the fishing rod 30 from the gunwale rod holder 10, they would simply release the retainer clasp 23 and pick up the fishing rod 30, while the retainer cable 22 is again biased to retract back down the retainer channel 25, This eliminates any chance of entanglement with the retainer cable 22 while actively fighting a fish or re-rigging, baiting etc. Since the length of the rod retainer 20 is already set, when the fisherman is ready to place the fishing rod 30 in the gunwale rod holder 10 again, there will not be a need to adjust the cable length setting device 26 as it is already set to the desired length of retainer cable 22.

Figure 4:
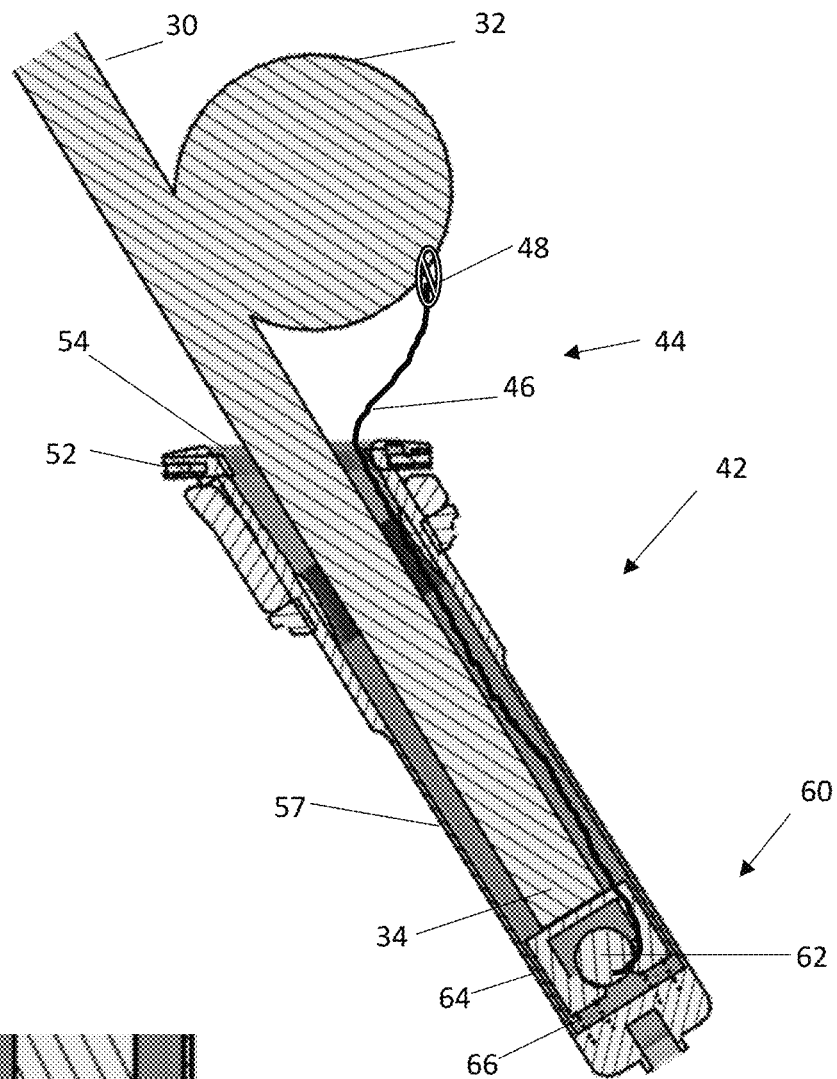
FIG. 4 is a cross-sectional side view of another embodiment of the fishing rod holder and retainer including a spring loaded locking spool in accordance with features of the present invention.

Another embodiment will be described with reference to FIGS. 4-6. FIG. 4 is a cross-sectional side view of a fishing rod holder 42 and retainer 44 according to an embodiment of the invention. The fishing rod holder 42 extends below the gunwale of a boat. So, the fishing rod holder 42 and retainer 44 are configured to hold and retain the fishing rod 30 in the gunwale of the boat. The fishing rod holder 42 includes a top plate 52 configured to be mounted on a top surface of the gunwale of the boat. The shape of the top plate 52 may vary but is typically round or oval. The top plate 52 includes a main opening 54 configured to receive the butt 34 of the fishing rod 30. The top plate 52 may also include a retainer opening and a retainer fastener recess (also referred to as retainer fastener storage, for example, a retainer clasp recess), adjacent the main opening 54, to house a retainer fastener 48 when not in use, as discussed with respect to the first embodiment above. A cylindrical tube 57 is coupled to the top plate 52 and aligned with the main opening 54 and configured to extend downwardly at an angle into the gunwale of the boat to hold the butt 34 of the fishing rod 30. The top plate 52 and cylindrical tube 57 are preferably made of stainless steel or any other corrosion resistant material such powder coated aluminum or marine plastics, such as high-density polyethylene (HDPE).

The rod retainer 44 may be adjustable, settable and/or retractable, includes a retainer tether 46 having the retainer fastener 48 at a distal end thereof and positioned for extension at the top plate 52 to couple to the fishing rod 30. The retainer fastener 48 is configured to couple to a fixture on a reel 32 of the fishing rod 30 or to a fixture on the rod 30. The retainer tether 46 can be any of a cable, cord, lace, lacing, line, rope, string, fiber, wire or any other elongated, flexible or stiff, retaining feature capable of being extended, adjusted, set and retracted for example. For example, the tether 46 may be Kevlar® or Dyneema®. The retainer fastener 48 can be any of various devices that clasp, grip, fasten, hook or otherwise releasably secure, couple, connect or attach the retainer tether 46 to the rod 30 and/or reel 32. Both the retainer tether 46 and the retainer fastener 48 may be coated with a protective coating such as vinyl, plastic, paint, etc.

Again, a biasing device 60 is coupled to the retainer tether 46 at a proximal portion thereof and configured to bias the retainer tether 46 downwardly within the gunwale (e.g. internally or externally of the cylindrical tube 57. In this embodiment, the biasing device 60 includes a spring loaded locking spool 62 positioned at a bottom of the cylindrical tube 57 and configured to store a proximal portion of the retainer tether 46 thereon while being biased to retract the tether 46. The spring loaded locking spool 62 may include a brake arrangement which includes a brake 64 and spring(s) 66 configured to stop the retainer tether 46 at a selected length during extension of the retainer fastener 48 and retainer tether 46.

Figure 5:
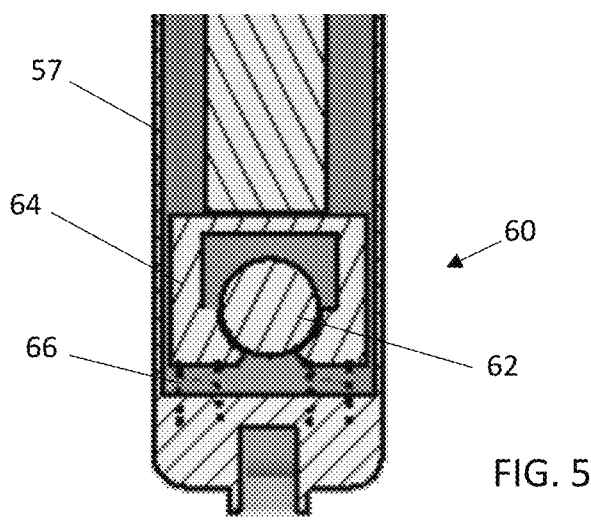
FIG. 5 is an enlarged cross-sectional view of a portion of the fishing rod holder and retainer of FIG. 4 including the spring loaded locking spool in the locked position.
Figure 6:
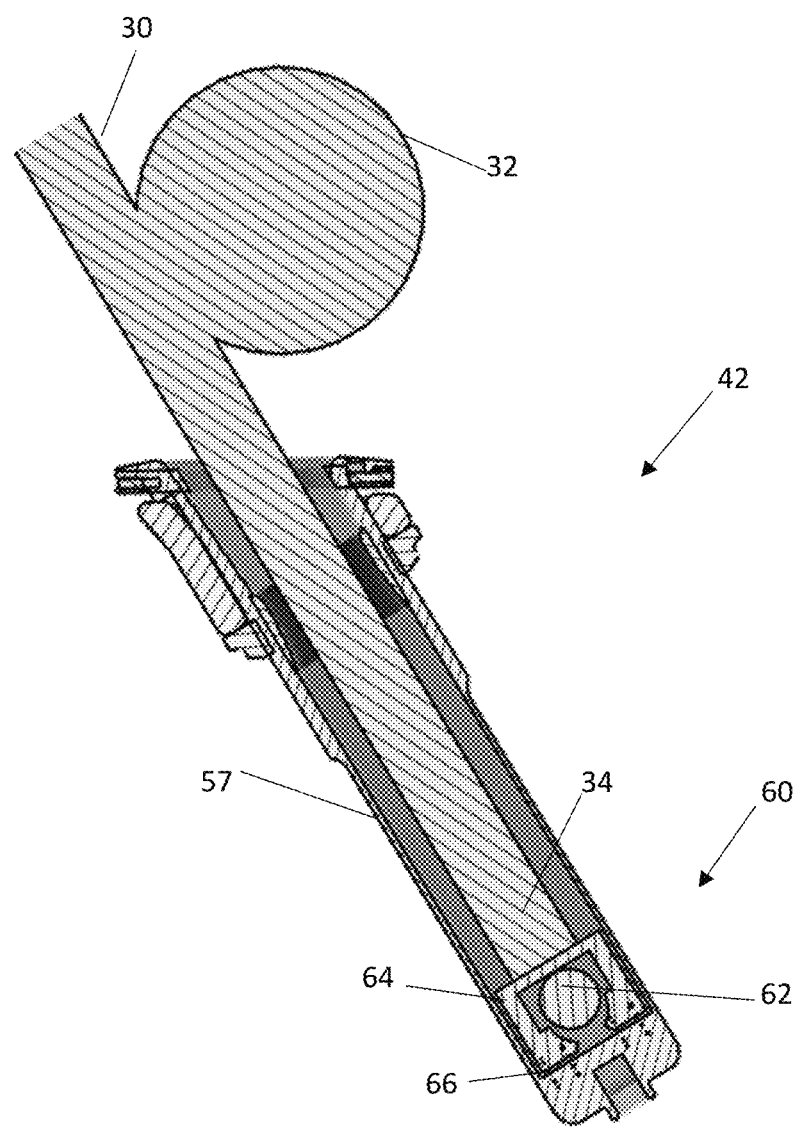
FIG. 6 is a cross-sectional side view of the fishing rod holder and retainer of FIG. 4 including the spring loaded locking spool in the unlocked position.

FIG. 5 is an enlarged cross-sectional view of a portion of the fishing rod holder 42 and retainer 44 of FIG. 4 including the spring loaded locking spool 62 in the locked position (e.g. the brake 64 biased upward against the spool 62 via the springs 66). FIG. 6 is a cross-sectional side view of the fishing rod holder 42 and retainer 44 of FIG. 4 including the spring loaded locking spool 62 in the unlocked position, i.e., the brake 64 is pushed downward by the rod 30 against the bias force of the springs 66 to release the spool 62 and allow the tether 46 to be extended or retracted.

Accordingly, while offshore fishing (trolling, kite fishing etc.), a fisherman will place the butt of their fishing rod 30 (and attached reel 32) into the gunwale rod holder 42 of the present invention. Then, the fisherman may push the rod down 30 down so that the butt of the rod 30 pushes the brake 64 downward against the springs 66 to release the spool 62. The fisherman will grab the retainer fastener 48 and pull a length of retainer tether 46 out. The retainer fastener 48 is then coupled to the fishing rod 30, e.g. to a fixture on the reel 32 of the fishing rod 30 or to a fixture on the rod 30 itself. The biasing device 60 will then lock the brake 64 against the spool 62 as the downward pressure of the rod 30 is released. The fisherman may then leave the rod unattended while fishing and/or boating as the fishing rod 30 and reel 32 are securely retained in the gunwale rod holder 42.

When the fisherman needs to retrieve the fishing rod 30 from the gunwale rod holder 42, they would simply release the retainer fastener 48 and pick up the fishing rod 30, while the retainer tether 46 is again biased to retract back down. This eliminates any chance of entanglement with the retainer tether 46 while actively fighting a fish or re-rigging, baiting etc.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features; concepts; examples; etc. described with reference to one or more of the embodiments discussed herein. Further, from figure to figure, the embodiments may incorporate the same or similarly named functions, steps, modules, etc. that may use the same or different reference numbers and; as such; the functions, steps, modules, etc. may be the same or similar functions; steps, modules; etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced items. Thus, the scope of the invention should be determined by the appended claims and their legal equivalents, and not by the examples given.

The invention claimed is:

1. A fishing rod holder and retainer configured to hold and retain a fishing rod in a gunwale of a boat, the fishing rod holder and retainer comprising:

a top plate configured to be mounted on a top surface of the gunwale of the boat, and including a main opening configured to receive a butt of the fishing rod, and a retainer opening;

a cylindrical tube, coupled to the top plate, aligned with the main opening, and configured to extend downwardly at an angle into the gunwale of the boat to hold the butt of the fishing rod;

a rod retainer comprising a retainer tether having a retainer fastener at a distal end thereof and positioned for extension at the top plate adjacent the retainer opening to couple to the fishing rod; and a biasing device coupled to the retainer tether at a proximal portion thereof and configured to bias the retainer tether downwardly within the retainer opening;

wherein the top plate further includes a retainer fastener storage, adjacent the main opening, to house the retainer fastener when not in use;

wherein the retainer fastener storage is integrated with the retainer opening within the top plate;

wherein the biasing device includes a spring loaded locking spool positioned at a bottom of the cylindrical tube and configured to store a proximal portion of the retainer tether thereon;

wherein the spring loaded locking spool defines a brake configured to stop the retainer tether at a selected length during extension of the retainer fastener and retainer tether;

wherein the brake is configured to selectively release the spring loaded locking spool via a downward pressure of the fishing rod held within the fishing rod holder.

2. The fishing rod holder and retainer according to claim 1, wherein the retainer fastener is configured to couple to a fixture on a reel of the fishing rod.

3. The fishing rod holder and retainer according to claim 1, wherein the retainer fastener is configured to couple to a fixture on the fishing rod.

4. The fishing rod holder and retainer according to claim 1, wherein the top plate, and cylindrical tube are stainless steel.

5. The fishing rod holder and retainer according to claim 1, wherein the retainer tether includes a protective coating.

6. A fishing rod holder and retainer configured to hold and retain a fishing rod in a gunwale of a boat, the fishing rod holder and retainer comprising:

a top plate configured to be mounted on a top surface of the gunwale of the boat, and including a main opening configured to receive a butt of the fishing rod, a retainer opening, and a retainer fastener storage integrated within the top plate, adjacent the main opening;

a cylindrical tube, coupled to the top plate, aligned with the main opening, and configured to extend downwardly at an angle into the gunwale of the boat to hold the butt of the fishing rod; and a rod retainer comprising a retainer tether having a retainer fastener at a distal end thereof and positioned for extension at the top plate adjacent the retainer opening to couple to the fishing rod, and wherein the retainer fastener storage houses the retainer fastener when not in use; and a biasing device coupled to the retainer tether at a proximal portion thereof and configured to bias the retainer tether downwardly;

wherein the biasing device includes a spring loaded locking spool positioned at a bottom of the cylindrical tube and configured to store a proximal portion of the retainer tether thereon;

wherein the spring loaded locking spool defines a brake configured to stop the retainer tether at a selected length during extension of the retainer fastener and retainer tether;

wherein the brake is configured to selectively release the spring loaded locking spool via a downward pressure of the fishing rod held within the fishing rod holder.

7. The fishing rod holder and retainer according to claim 6, wherein the retainer fastener is configured to couple to a fixture on a reel of the fishing rod.

8. The fishing rod holder and retainer according to claim 6, wherein the retainer fastener is configured to couple to a fixture on the fishing rod.

9. The fishing rod holder and retainer according to claim 6, wherein the top plate and cylindrical tube are stainless steel; and wherein the retainer cable includes a protective coating.

10. A fishing rod holder and retainer comprising:

a top plate including a main opening and a retainer opening;

a cylindrical tube coupled to the top plate, aligned with the main opening, and configured to extend downwardly away from the top plate at an angle;

a rod retainer comprising a retainer tether having a retainer fastener at a distal end thereof and positioned for extension at the top plate adjacent the retainer opening;

a biasing device coupled to the retainer tether at a proximal portion thereof and configured to bias the retainer tether downwardly;

wherein the top plate further includes a retainer fastener storage, adjacent the main opening, to house the retainer fastener when not in use;

wherein the retainer fastener storage is integrated with the retainer opening within the top plate; and wherein the biasing device includes a spring loaded locking spool positioned at a bottom of the cylindrical tube and configured to store a proximal portion of the retainer tether thereon;

wherein the spring loaded locking spool defines a brake configured to stop the retainer tether at a selected length during extension of the retainer fastener and retainer tether;

wherein the brake is configured to selectively release the spring loaded locking spool via a downward pressure of the fishing rod held within the fishing rod holder.

11. The fishing rod holder and retainer according to claim 10, wherein the top plate and cylindrical tube are stainless steel; and wherein the retainer tether includes a protective coating.

* * * * *